US012383821B2

(12) United States Patent
Teng

(10) Patent No.: US 12,383,821 B2
(45) Date of Patent: Aug. 12, 2025

(54) LUMINESCENCE INDICATOR LED CONTROL METHOD, LUMINESCENCE INDICATOR LED, GAME CONTROLLER JOYSTICK AND GAMEPAD

(71) Applicant: Shenzhen Qanba Technology Development Co., Ltd, Shenzhen (CN)

(72) Inventor: Ya'en Teng, Shenzhen (CN)

(73) Assignee: Shenzhen Qanba Technology Development Co., Ltd, Shenzhen (CN)

( * ) Notice: Subject to any disclaimer, the term of this patent is extended or adjusted under 35 U.S.C. 154(b) by 418 days.

(21) Appl. No.: 18/109,289

(22) Filed: Feb. 14, 2023

(65) Prior Publication Data
US 2023/0191245 A1    Jun. 22, 2023

(30) Foreign Application Priority Data

May 17, 2022  (CN) .......................... 202210534139.9

(51) Int. Cl.
*A63F 13/24*    (2014.01)
(52) U.S. Cl.
CPC .................................... *A63F 13/24* (2014.09)
(58) Field of Classification Search
CPC ......... A63F 13/24; A63F 13/422; Y02B 20/30
See application file for complete search history.

(56) References Cited

U.S. PATENT DOCUMENTS

| | | | |
|---|---|---|---|
| 6,402,616 B1 * | 6/2002 | Ogata | A63F 13/23 345/170 |
| 8,008,563 B1 * | 8/2011 | Hastings | G09B 15/08 84/479 A |
| 2002/0034826 A1 | 3/2002 | Huber et al. | |
| 2003/0101803 A1 | 6/2003 | Huber et al. | |
| 2012/0292164 A1 | 11/2012 | Lin et al. | |

* cited by examiner

*Primary Examiner* — Peter J Iannuzzi
(74) *Attorney, Agent, or Firm* — Jose Cherson Weissbrot

(57) ABSTRACT

The present disclosure relates to the technical field of game equipment. The present disclosure provides a luminescence indicator LED control method, a luminescence indicator LED, a game controller joystick and a gamepad. The luminescence indicator LED control method includes acquiring an input command of a game operation; acquiring, according to the acquired input command, command data of corresponding game characters stored in a database server; outputting complete demonstration operation template data of direction LEDs and button LEDs according to the command data; and receiving, by the direction LEDs and the button LEDs, the command data, and performing light-up operation on the LEDs according to the demonstration operation template data and a corresponding light-up order.

16 Claims, 4 Drawing Sheets

LUMINESCENCE INDICATOR LED CONTROL METHOD, LUMINESCENCE INDICATOR LED, GAME CONTROLLER JOYSTICK AND GAMEPAD

TECHNICAL FIELD

The present disclosure relates to the technical field of game equipment, in particular to a luminescence indicator LED control method, a luminescence indicator LED, a game controller joystick and a gamepad.

BACKGROUND

In the field of game peripherals, a shaft joystick and a gamepad are important game input devices. Traditional shaft joysticks and gamepads both have levers for controlling directions and D-pads. Controlling directions belongs to blind operation, so that a wrong command is easily input. The input step of the previous operation cannot be seen, so it is hard to correct errors, easily causing a habitual error of a gesture input command and resulting in a failure in a competitive game.

Some competitive games have extremely high requirements for direction inputting, and only 360-degree precise operations can complete output commands in the games, which increases the difficulty of blind operations. Since there is no outputting standard or demonstration process of a reference direction, it is difficult to correct an output gesture command.

For example, in some fighting games, attack gestures, directions of a lever and buttons form a close cooperation output commands, and the requirements for gestures need to be more precise. At present, there is no platform for all fighting games and for every character in the games to demonstrate moves and train gestures, making it difficult for beginners to experience the charm of the fighting games.

SUMMARY

In order to solve the technical problems in the prior art, the present disclosure mainly aims to provide a luminescence indicator LED control method, a luminescence indicator LED, a game controller joystick and a gamepad.

In a first aspect, the present disclosure provides a luminescence indicator LED control method, including the following steps:
  acquiring an input command of a game operation;
  acquiring, according to the acquired input command, command data of corresponding game characters stored in a database server;
  outputting complete demonstration operation template data of direction LEDs and button LEDs according to the command data; and
  receiving, by the direction LEDs and the button LEDs, the command data, and performing light-up operation on the LEDs according to the demonstration operation template data and a corresponding light-up order.

In a further solution of the present disclosure, the input command is received through a direction control switch and a potentiometer.

In a further solution of the present disclosure, before the acquiring command data of corresponding game characters stored in a database server, the method further includes:
  transmitting the input command received by the direction control switch and the potentiometer to a main control integrated circuit, and storing the input command through a micro control unit.

In a further solution of the present disclosure, the database server makes a response when the input command received by the main control integrated circuit is performing a demonstration operation.

In a further solution of the present disclosure, after the command data of the database server is acquired, and the complete demonstration operation temperature data of the direction LEDs and the button LEDs are output, the micro control unit is also configured to send an output command; and the direction LEDs and the button LEDs receive the output command.

In a further solution of the present disclosure, the database server stores an operation demonstration template for performing the demonstration operation, and is configured to provide the operation demonstration template to the main control integrated circuit; and the main control integrated circuit analyzes the operation demonstration template to acquire demonstration operation performing command data in the operation demonstration template.

In a further solution of the present disclosure, the direction LEDs and the button LEDs are light-emitting units on a control console, and the light-emitting units are divided into button light-emitting units and lever light-emitting units.

In a further solution of the present disclosure, the performing light-up operation on the LEDs according to the demonstration operation template data and a corresponding light-up order includes: correspondingly lighting up or lighting off, according to the order, the direction LEDs and the button LEDs recorded in the operation demonstration template; controlling the direction LEDs and the button LEDs to be lit up in sequence by the main control integrated circuit to demonstrate a skill release process of the whole game, wherein the previous LED is lit off when the latter LED is lit up.

In a second aspect, the present disclosure provides a luminescence indicator LED. The luminescence indicator LED is used for demonstrating an input order of game operations on the basis of the luminescence indicator LED control method; the luminescence indicator LED is an LED arranged on a printed circuit board (PCB); the LED is covered with a plastic light guide piece; and the plastic light guide piece is an acrylic light-transmittance material.

In a third aspect, the present disclosure provides a game controller joystick, including levers and buttons for game operations. The levers and the buttons are provided with the luminescence indicator LEDs for luminescence indication; the levers and the buttons are operated to input commands; when the main control integrated circuit receives the input commands which are performing a demonstration operation, the database server makes a response to acquire command data of corresponding game characters stored in the database server, and outputs complete demonstration operation template data of the direction LEDs and the button LEDs according to the command data; the direction LEDs and the button LEDs receive the command data, and perform light-up operation on the LEDs according to the demonstration operation template data and a corresponding light-up order; and in the light-up operation, operations on the levers or the buttons and the light-up operation on the LEDs are performed alternately.

In a fourth aspect, the present disclosure provides a gamepad, including a D-pad and a 3D analog joystick for game operations; the D-pad and the 3D analog joystick are provided with the luminescence indicator LEDs for luminescence indication; the D-pad and the 3D analog joystick are operated to input commands; when the main control integrated circuit receives the input commands which are performing a demonstration operation, the database server makes a response to acquire command data of corresponding game characters stored in the database server, and outputs complete demonstration operation template data of the direction LEDs and the button LEDs according to the command data; the direction LEDs and the button LEDs receive the command data, and perform light-up operation on the LEDs according to the demonstration operation template data and a corresponding light-up order; and in the light-up operation, operations on the D-pad or the 3D analog joystick and the light-up operation on the LEDs are performed alternately.

Compared with the prior art, the present disclosure has the following beneficial effects.

The luminescence indicator LED control method, the luminescence indicator LED, the game controller joystick and the gamepad provided by the present disclosure are simple in structure and convenient to assemble. The indicator LEDs and the button LEDs corresponding to the levers, D-pads, mushroom head potentiometers and the like on the game controller joystick and the gamepad are controlled to be lit up by means of shaking or pressing. The database server acquires a command until a light order of corresponding positions is displayed on the game controller joystick and the gamepad, and training and demonstration are performed. According to the direction LEDs corresponding to the game controller joystick and the gamepad, an operator can clearly see whether input gestures are correct, so as to precisely input game operations. The command data of the game characters in the database server can be acquired. An input order of moves in a game is demonstrated by light, and operations can be trained and demonstrated with reference to lit-up portions.

These and other aspects of the present disclosure will be clearer and more understandable in the descriptions of the following embodiments. It should be understood that the above general description and the following detailed description are exemplary and explanatory only, and are not intended to limit the present disclosure.

BRIEF DESCRIPTION OF THE DRAWINGS

In order to describe the technical solutions in the embodiments of the present disclosure more clearly, the drawings needing to be used in the descriptions of the embodiments or the prior art will be briefly introduced below. Apparently, the drawings in the descriptions below are only some embodiments of the present disclosure. In the drawings.

The achievement of objectives, function characteristics, and advantages of the present disclosure will be further described with reference to accompanying drawings.

DETAILED DESCRIPTION OF THE EMBODIMENTS

This part will describe the specific embodiments of the present disclosure in detail. The preferred embodiments of the present disclosure are shown in the accompanying drawings. The role of the drawings is to supplement the description of the text part of the specification with graphics, so that people can intuitively and vividly understand each technical feature and the overall technical solution of the present disclosure, but it cannot be understood as a limitation to the protection scope of the present disclosure.

In the description of the present disclosure, "several" means one or more; "multiple" means two or more; "greater than", "less than", "exceeding", and the like mean not including this number; and "above", "below", and "within" are understood as including this number.

In the description of the present disclosure, the successive numbering of the method steps is for the convenience of examination and understanding. In combination with the overall technical solution of the present disclosure and a logical relationship between all the steps, adjusting the implementation order of the steps will not affect the technical effects achieved by the technical solution of the present disclosure.

In the description of the present disclosure, unless otherwise specified, terms, such as arrange, should be understood in a broad sense, and those skilled in the art can reasonably determine the specific meanings of the above words in the present disclosure in combination with the specific content of the technical solution.

In an implementation of the present disclosure, a luminescence indicator LED control method, a luminescence indicator LED, a game controller joystick and a gamepad are provided. An assembling method of the luminescence indicator LED control method can be applied to a game peripheral with luminescence indicator LEDs. The game peripheral with the luminescence indicator LEDs can be control equipment, such as a connection PC, a portable computer and a mobile terminal, with display and processing functions. Of course, it is not limited to this.

Figure 1:
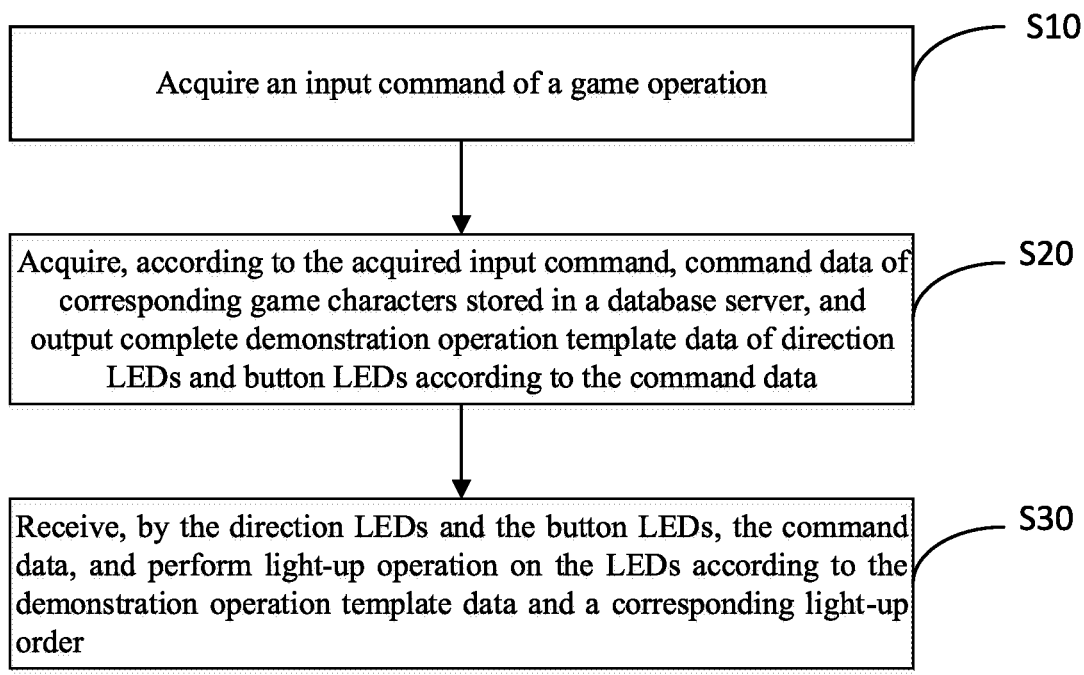
FIG. 1 is a flow chart of a luminescence indicator LED control method in an embodiment of the present disclosure.
Figure 2:
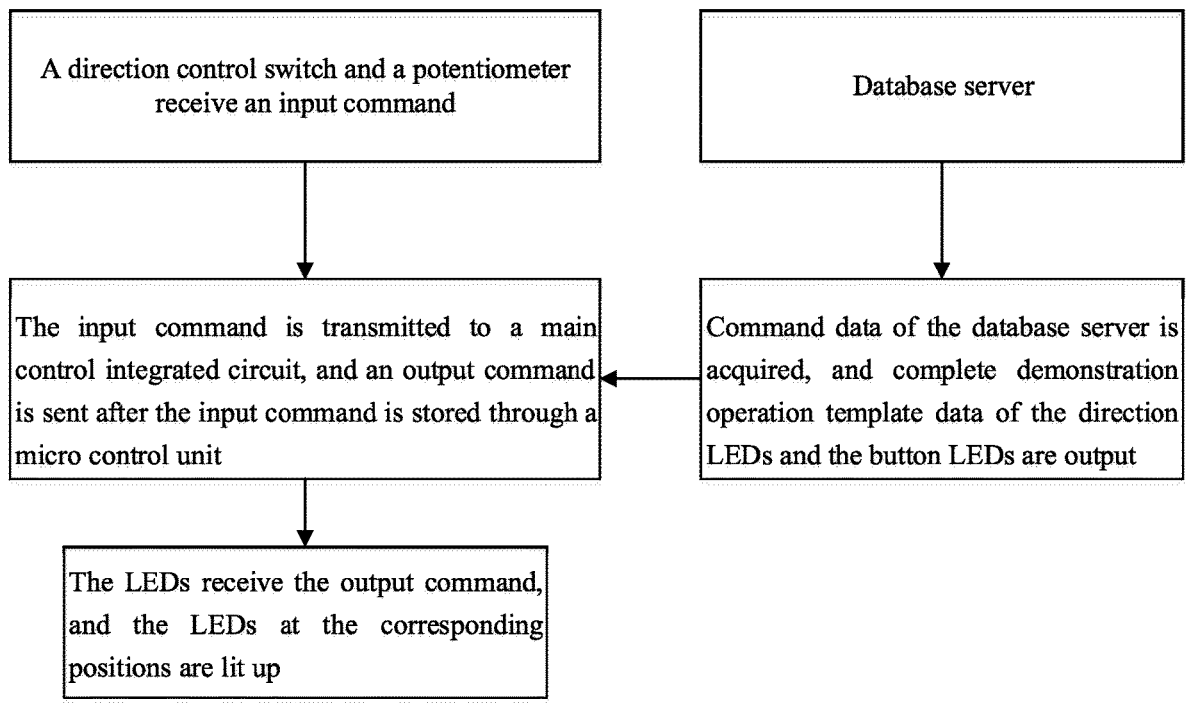
FIG. 2 is a schematic diagram of an operation process of a luminescence indicator LED control method in an embodiment of the present disclosure.

Referring to FIG. 1 and FIG. 2, the luminescence indicator LED control method includes the following steps S10 to S30:

step S10: an input command of a game operation is acquired.

In this embodiment of the present disclosure, the input command is received through a direction control switch and a potentiometer. A direction control switch and a potentiometer are arranged below operable buttons or levers of a game controller joystick or a gamepad. The direction control switch and the potentiometer are triggered by an operation crossing the game controller joystick or the gamepad, and an action during the operation is converted into an input command.

The input command received by the direction control switch and the potentiometer is transmitted to a main control integrated circuit, and the input command is stored through a micro control unit.

Step S20, command data of corresponding game characters stored in a database server is acquired according to the acquired input command, and complete demonstration operation template data of direction LEDs and button LEDs are output according to the command data.

In this embodiment of the present disclosure, the database server makes a response when the input command received by the main control integrated circuit is performing a demonstration operation.

The database server stores an operation demonstration template for performing the demonstration operation, and is configured to provide the operation demonstration template to the main control integrated circuit; and the main control integrated circuit analyzes the operation demonstration template to acquire demonstration operation performing command data in the operation demonstration template.

Step 30, the direction LEDs and the button LEDs receive the command data, and light-up operation is performed on the LEDs according to the demonstration operation template data and a corresponding light-up order.

In this embodiment of the present disclosure, after the command data of the database server is acquired, and the complete demonstration operation temperature data of the direction LEDs and the button LEDs are output, the micro control unit is also configured to send an output command; and the direction LEDs and the button LEDs receive the output command.

In some embodiments of the present disclosure, the direction LEDs and the button LEDs are light-emitting units on a control console, and the light-emitting units are divided into button light-emitting units and lever light-emitting units.

In this embodiment of the present disclosure, the step that light-up operation is performed on the LEDs according to the demonstration operation template data and a corresponding light-up order includes: the direction LEDs and the button LEDs recorded in the operation demonstration template are correspondingly lit up or lit off according to the order; the direction LEDs and the button LEDs are controlled to be lit up in sequence to demonstrate a skill release process of the whole game; and the previous LED is lit off when the latter LED is lit up.

In this embodiment of the present disclosure, by means of acquiring the command data of the game characters in the database server, an input order of moves in a game can be demonstrated by light, and operations can be trained and demonstrated with reference to lit-up portions.

When the luminescence indicator LED control method is implemented, according to the direction LEDs corresponding to the game controller joystick and the gamepad, an operator can clearly see whether input gestures are correct, so as to precisely input game operations. The command data of the game characters in the database server can be acquired; an input order of moves in a game can be demonstrated by light; and operations can be trained and demonstrated with reference to lit-up portions.

Specifically, during operation, the indicator LEDs and the button LEDs corresponding to the levers, D-pads, mushroom head potentiometers and the like on the game controller joystick and the gamepad are controlled to be lit up by means of shaking or pressing. The database server acquires a command until a light order of corresponding positions is displayed on the game controller joystick and the gamepad, and training and demonstration are performed. The indicator LEDs and the button LEDs are controlled to be lit up in sequence by means of shaking or pressing according to a light order, thus demonstrating the entire game operation or skill release process.

In some embodiments of the present disclosure, the present disclosure further provides a luminescence indicator LED. The luminescence indicator LED is used for demonstrating an input order of game operations on the basis of the luminescence indicator LED control method; the luminescence indicator LED is an LED arranged on a PCB; the LED is covered with a plastic light guide piece; and the plastic light guide piece is an acrylic light-transmittance material.

When the luminescence indicator LED is lit up, by means of acquiring the command data of the game characters in the database server, an input order of moves in a game can be demonstrated by light, and operations can be trained and demonstrated with reference to lit-up portions. When the LEDs are lit up, light emitted by the LEDs is transmitted through the plastic light guide piece. The plastic light guide piece is arranged on the levers, D-pads and mushroom head potentiometers on the game controller joystick and the gamepad. According to lit-up LEDs, buttons that move towards the lit-up LEDs are shook or buttons at the lit-up LEDs are pressed. After corresponding buttons are pressed or the corresponding levers are operated according to the lit-up LEDs, the LED corresponding to the current button or lever is lit-off, and the next LED is lit-up according to a game operation or skill release requirement to perform a next game operation.

Figure 3:
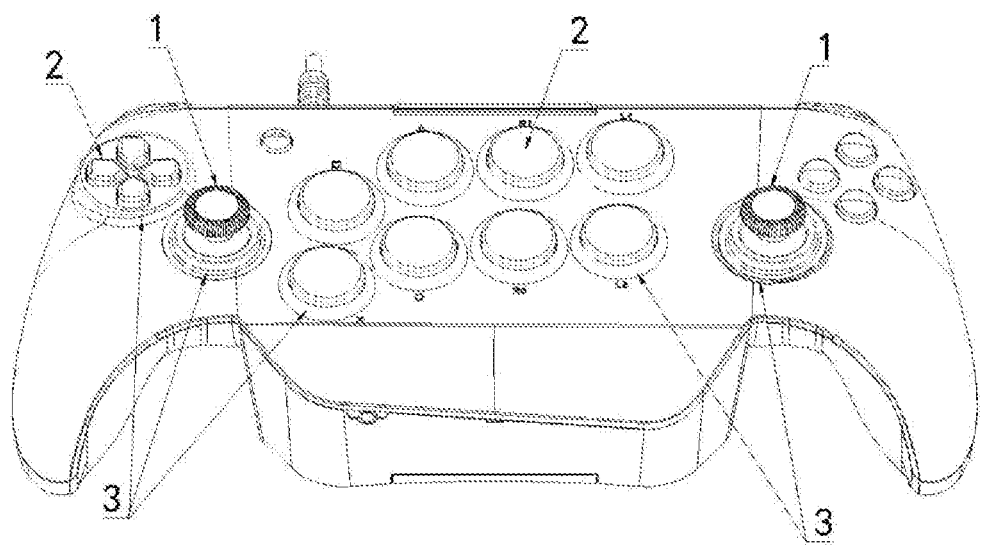
FIG. 3 is a schematic structural diagram of a game controller joystick in an embodiment of the present application.

In some embodiments of the present disclosure, referring to FIG. 3, the present disclosure further provides a game controller joystick. The game controller joystick includes levers 1 and buttons 2 for game operations. The levers 1 and the buttons 2 are provided with the luminescence indicator LEDs 3 for luminescence indication; the levers 1 and the buttons 2 are operated to input commands; when the main control integrated circuit receives the input commands which are performing a demonstration operation, the database server makes a response to acquire command data of corresponding game characters stored in the database server, and outputs complete demonstration operation template data of the direction LEDs and the button LEDs according to the command data; the direction LEDs and the button LEDs receive the command data, and perform light-up operation on the LEDs according to the demonstration operation template data and a corresponding light-up order; and in the light-up operation, operations on the levers 1 or the buttons 2 and the light-up operation on the LEDs are performed alternately.

Figure 4:
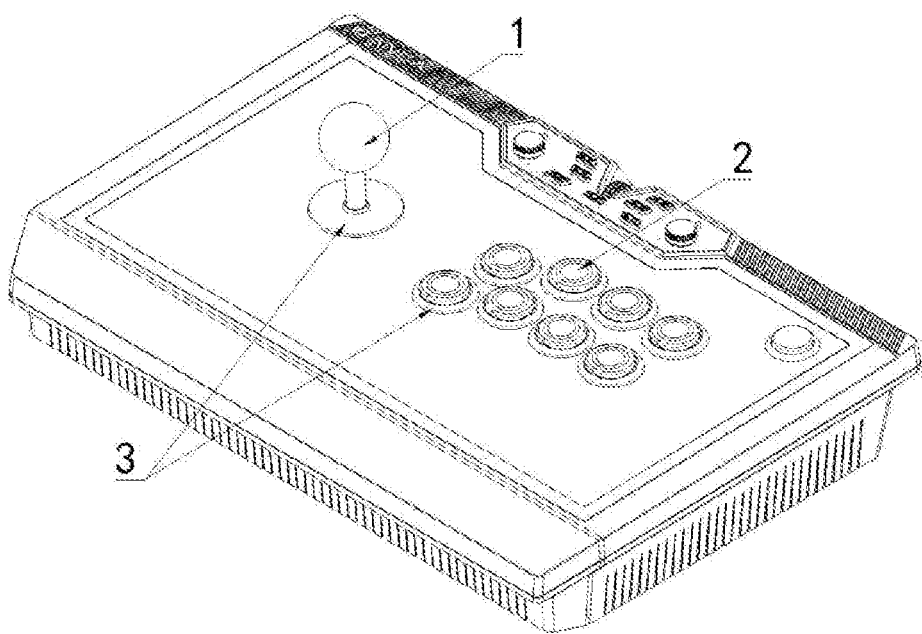
FIG. 4 is a schematic structural diagram of a gamepad in an embodiment of the present application.

In some embodiments of the present disclosure, referring to FIG. 4, the present disclosure further provides a gamepad. The gamepad includes a D-pad and a 3D analog joystick for game operations. The D-pad and the 3D analog joystick are provided with the luminescence indicator LEDs 3 for luminescence indication; the D-pad and the 3D analog joystick are operated to input commands; when the main control integrated circuit receives the input commands which are performing a demonstration operation, the database server makes a response to acquire command data of corresponding game characters stored in the database server, and outputs complete demonstration operation template data of the direction LEDs and the button LEDs according to the command data; the direction LEDs and the button LEDs receive the command data, and perform light-up operation on the LEDs according to the demonstration operation template data and a corresponding light-up order; and in the light-up operation, operations on the D-pad or the 3D analog joystick and the light-up operation on the LEDs are performed alternately.

The luminescence indicator LED control method, the luminescence indicator LED, the game controller joystick and the gamepad provided by the present disclosure are simple in structure and convenient to assemble. The corresponding indicator LEDs and the button LEDs are controlled to be lit up by means of shaking or pressing by the game controller joystick and the levers, D-pad, mushroom head potentiometer and the like on the gamepad. The database server acquires a command until a light order of corresponding positions is displayed on the game controller joystick and the gamepad, and training and demonstration are performed. According to the direction LEDs corresponding to the game controller joystick and the gamepad, an operator can clearly know whether input gestures are correct, so as to precisely input game operations. The command data of the game characters in the database server can be acquired. An input order of moves in a game is demonstrated by light, and operations can be trained and demonstrated with reference to lit-up portions.

The above descriptions are only the preferred embodiments of the present disclosure, and are not intended to limit the scope of the present disclosure. Any equivalent structure or equivalent process transformation made by using the content of the description and drawings of the present disclosure and directly or indirectly applied to other related technical fields shall all be similarly included in the scope of patent protection of the present disclosure.

What is claimed is:

1. A luminescence indicator LED control method, comprising the following steps:
   acquiring an input command of a game operation;
   acquiring, according to the acquired input command, command data of corresponding game characters stored in a database server;
   outputting complete demonstration operation template data of direction LEDs and button LEDs according to the command data; and
   receiving, by the direction LEDs and the button LEDs, the command data, and performing light-up operation on the LEDs according to the demonstration operation template data and a corresponding light-up order.

2. The luminescence indicator LED control method according to claim 1, wherein the input command is received through a direction control switch and a potentiometer.

3. The luminescence indicator LED control method according to claim 2, wherein before the acquiring command data of corresponding game characters stored in a database server, the method further comprises:
   transmitting the input command received by the direction control switch and the potentiometer to a main control integrated circuit, and storing the input command through a micro control unit.

4. The luminescence indicator LED control method according to claim 3, wherein the database server makes a response when the input command received by the main control integrated circuit is performing a demonstration operation.

5. The luminescence indicator LED control method according to claim 3, wherein after the command data of the database server is acquired, and the complete demonstration operation temperature data of the direction LEDs and the button LEDs are output, the micro control unit is also configured to send an output command; and the direction LEDs and the button LEDs receive the output command.

6. The luminescence indicator LED control method according to claim 4, wherein the database server stores an operation demonstration template for performing the demonstration operation, and is configured to provide the operation demonstration template to the main control integrated circuit; and the main control integrated circuit analyzes the operation demonstration template to acquire demonstration operation performing command data in the operation demonstration template.

7. The luminescence indicator LED control method according to claim 3, wherein the performing light-up operation on the LEDs according to the demonstration operation template data and a corresponding light-up order comprises: correspondingly lighting up or lighting off, according to the order, the direction LEDs and the button LEDs recorded in the operation demonstration template; controlling the direction LEDs and the button LEDs to be lit up in sequence by the main control integrated circuit to demonstrate a skill release process of the whole game, wherein the previous LED is lit off when the latter LED is lit up.

8. A luminescence indicator LED, wherein the luminescence indicator LED is used for demonstrating an input order of game operations on the basis of the luminescence indicator LED control method according to claim 1; the luminescence indicator LED is an LED arranged on a printed circuit board (PCB); the LED is covered with a plastic light guide piece; and the plastic light guide piece is an acrylic light-transmittance material.

9. A luminescence indicator LED, wherein the luminescence indicator LED is used for demonstrating an input order of game operations on the basis of the luminescence indicator LED control method according to claim 2; the luminescence indicator LED is an LED arranged on a printed circuit board (PCB); the LED is covered with a plastic light guide piece; and the plastic light guide piece is an acrylic light-transmittance material.

10. A luminescence indicator LED, wherein the luminescence indicator LED is used for demonstrating an input order of game operations on the basis of the luminescence indicator LED control method according to claim 3; the luminescence indicator LED is an LED arranged on a printed circuit board (PCB); the LED is covered with a plastic light guide piece; and the plastic light guide piece is an acrylic light-transmittance material.

11. A luminescence indicator LED, wherein the luminescence indicator LED is used for demonstrating an input order of game operations on the basis of the luminescence indicator LED control method according to claim 4; the luminescence indicator LED is an LED arranged on a printed circuit board (PCB); the LED is covered with a plastic light guide piece; and the plastic light guide piece is an acrylic light-transmittance material.

12. A luminescence indicator LED, wherein the luminescence indicator LED is used for demonstrating an input order of game operations on the basis of the luminescence indicator LED control method according to claim 5; the luminescence indicator LED is an LED arranged on a printed circuit board (PCB); the LED is covered with a plastic light guide piece; and the plastic light guide piece is an acrylic light-transmittance material.

13. A luminescence indicator LED, wherein the luminescence indicator LED is used for demonstrating an input order of game operations on the basis of the luminescence indicator LED control method according to claim 6; the luminescence indicator LED is an LED arranged on a printed circuit board (PCB); the LED is covered with a plastic light guide piece; and the plastic light guide piece is an acrylic light-transmittance material.

14. A luminescence indicator LED, wherein the luminescence indicator LED is used for demonstrating an input order of game operations on the basis of the luminescence indicator LED control method according to claim 7; the luminescence indicator LED is an LED arranged on a printed circuit board (PCB); the LED is covered with a plastic light guide piece; and the plastic light guide piece is an acrylic light-transmittance material.

15. A game controller joystick, comprising levers and buttons for game operations, wherein the levers and the buttons are provided with the luminescence indicator LEDs according to claim 8 for luminescence indication; the levers and the buttons are operated to input commands; when the main control integrated circuit receives the input commands which are performing a demonstration operation, the database server makes a response to acquire command data of corresponding game characters stored in the database server, and outputs complete demonstration operation template data of the direction LEDs and the button LEDs according to the command data; the direction LEDs and the button LEDs receive the command data, and perform light-up operation on the LEDs according to the demonstration operation template data and a corresponding light-up order; and in the light-up operation, operations on the levers or the buttons and the light-up operation on the LEDs are performed alternately.

16. A gamepad, comprising a D-pad and a 3D analog joystick for game operations, wherein the D-pad and the 3D analog joystick are provided with the luminescence indicator LEDs according to claim 8 for luminescence indication; the D-pad and the 3D analog joystick are operated to input commands; when the main control integrated circuit receives the input commands which are performing a demonstration operation, the database server makes a response to acquire command data of corresponding game characters stored in the database server, and outputs complete demonstration operation template data of the direction LEDs and the button LEDs according to the command data; the direction LEDs and the button LEDs receive the command data, and perform light-up operation on the LEDs according to the demonstration operation template data and a corresponding light-up order; and in the light-up operation, operations on the D-pad or the 3D analog joystick and the light-up operation on the LEDs are performed alternately.

* * * * *